April 7, 1925.
F. A. PLUMMER
1,532,344
PROCESS OF DISINTEGRATING AND DRYING PEAT
Filed March 29, 1923   4 Sheets-Sheet 1
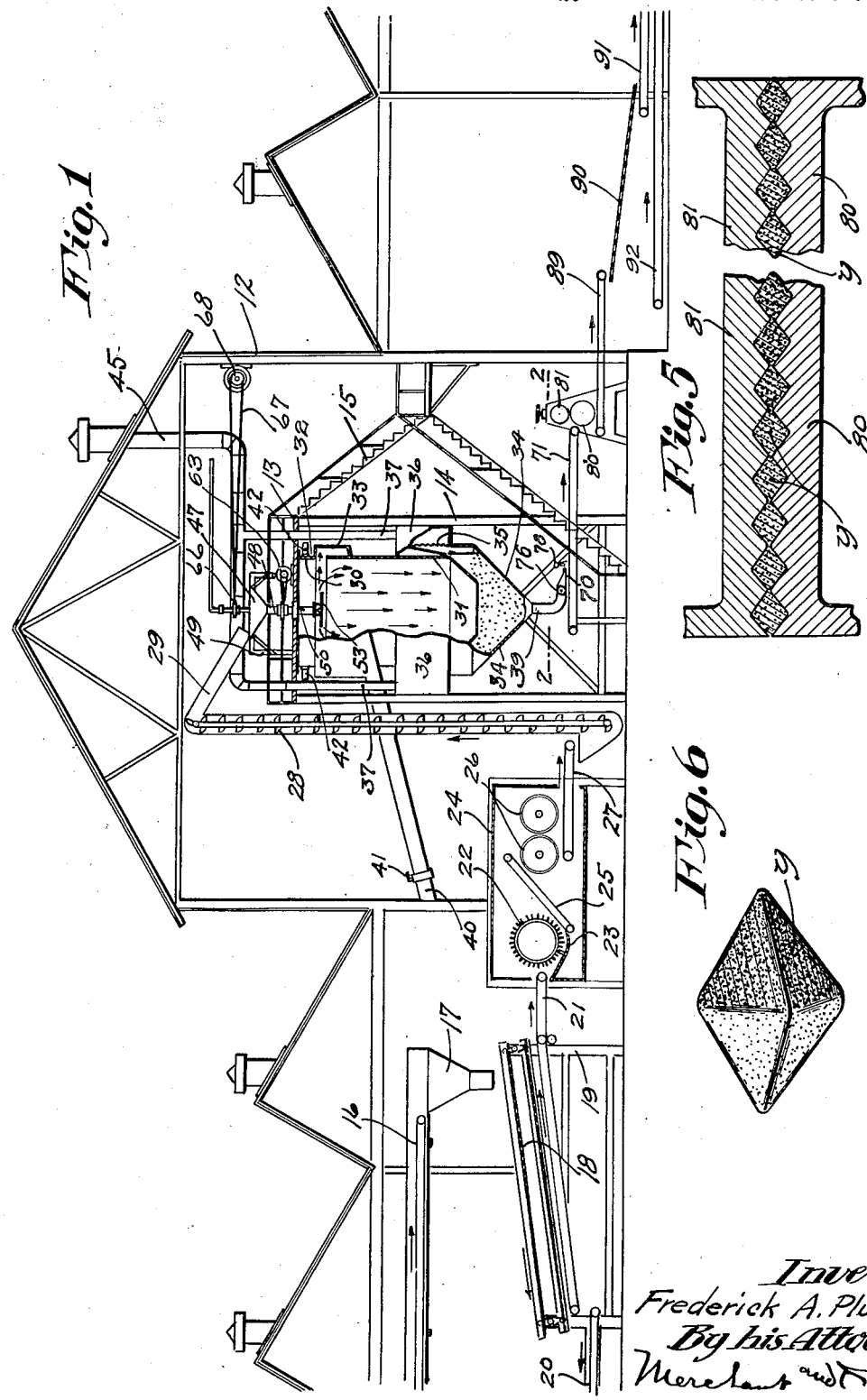
Inventor
Frederick A. Plummer
By his Attorneys

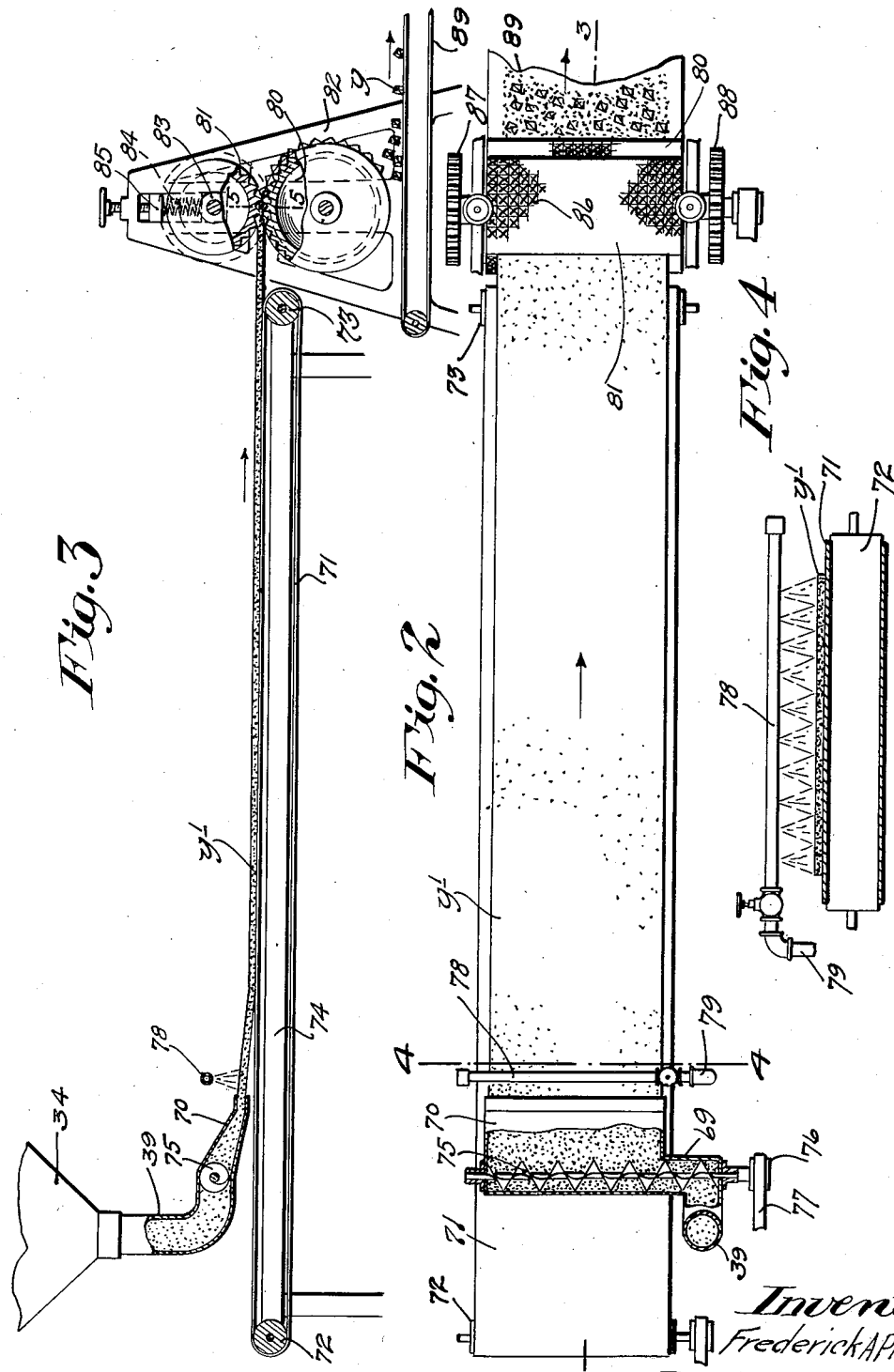

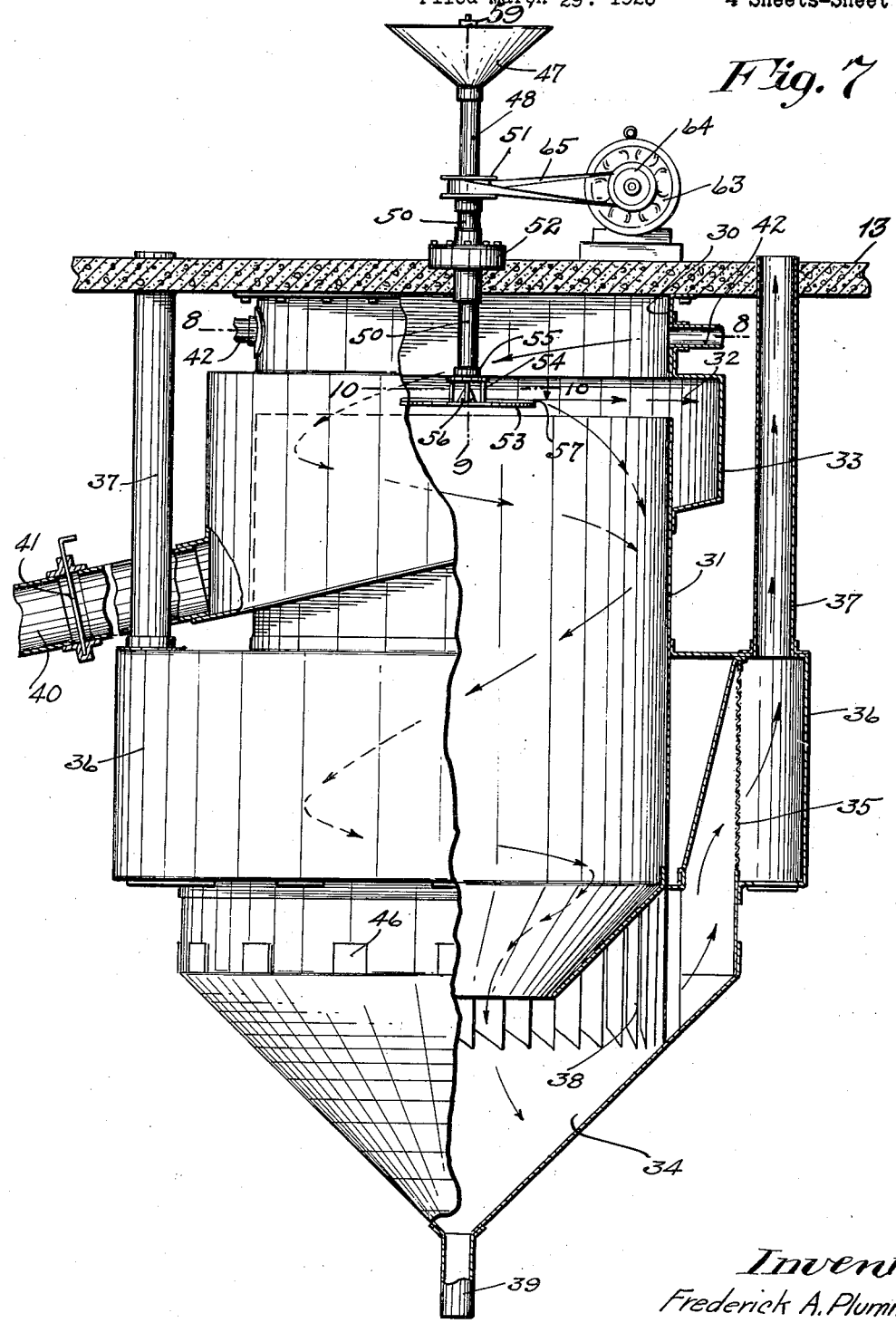

April 7, 1925. 1,532,344
F. A. PLUMMER
PROCESS OF DISINTEGRATING AND DRYING PEAT
Filed March 29, 1923 4 Sheets-Sheet 4
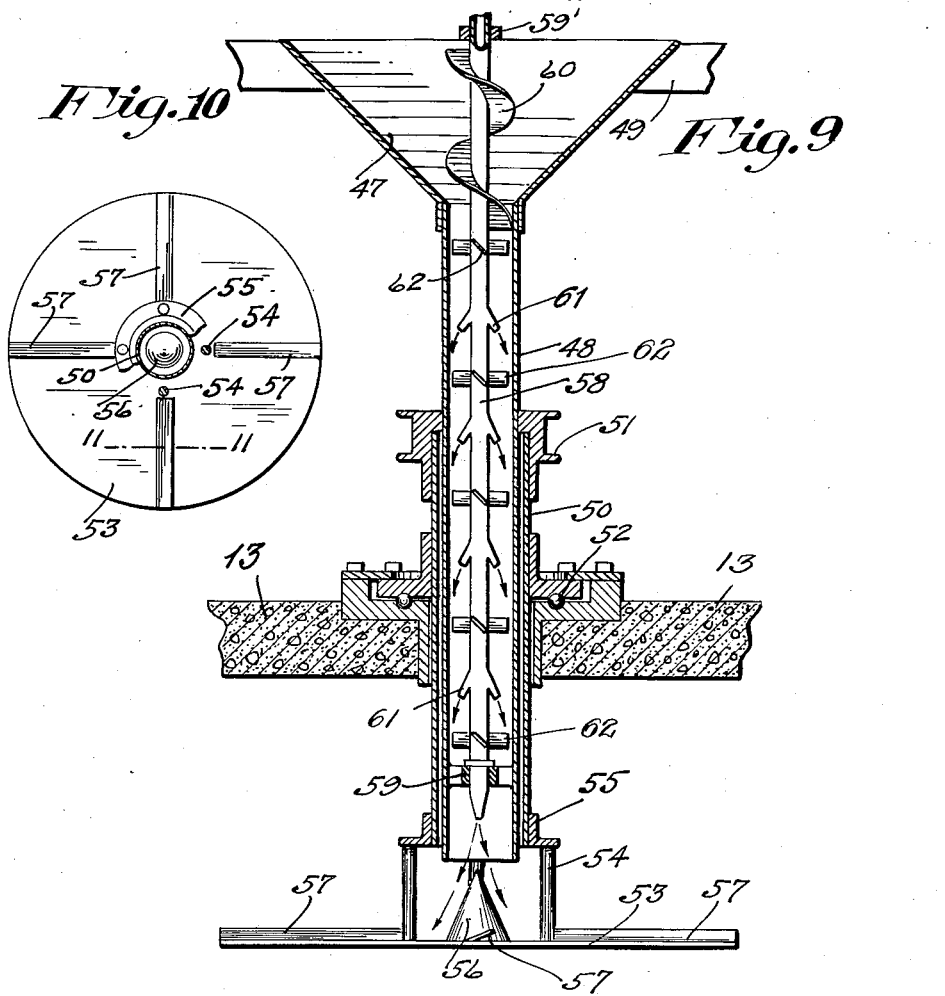
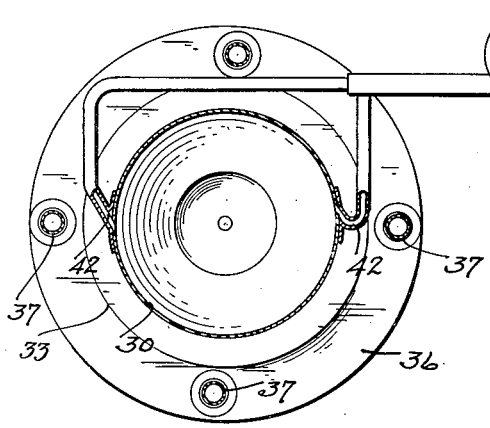
Inventor
Frederick A Plummer
By his Attorneys Patented Apr. 7, 1925.

1,532,344

UNITED STATES PATENT OFFICE.

FREDERICK A. PLUMMER, OF MINNEAPOLIS, MINNESOTA.

PROCESS OF DISINTEGRATING AND DRYING PEAT.

Application filed March 29, 1923. Serial No. 628,559.

*To all whom it may concern:*

Be it known that I, FREDERICK A. PLUMMER, a citizen of the United States, residing at Minneapolis, in the county of Hennepin and State of Minnesota, have invented certain new and useful Improvements in Processes of Disintegrating and Drying Peat; and I do hereby declare the following to be a full, clear, and exact description of the invention, such as will enable others skilled in the art to which it appertains to make and use the same.

My invention provides an improved process for drying, pulverizing or finely dividing peat but in its more complete aspect it provides an improved process of first, disintegrating or pulverizing the peat, second in projecting the pulverized or finely divided peat through a current of hot air to dry the same while suspended in the air, and third of compressing the dried pulverized or finely divided peat into the form of solid blocks, usually designated as briquettes. The invention also involves other important features as will hereinafter appear.

The accompanying drawings illustrate the apparatus especially designed for carrying out this improved process.

Fig. 1 is a diagrammatic elevation with some parts sectioned and some parts broken away, illustrating the complete apparatus or briquette-making installation;

Fig. 2 is a plan view of certain parts found just below the line marked 2—2 on Fig. 1;

Fig. 3 is a longitudinal section on the line 3—3 of Fig. 2;

Fig. 4 is a transverse section on the line 4—4 of Fig. 2;

Fig. 5 is an enlarged transverse vertical section on the line 5—5 of Fig. 3;

Fig. 6 is a perspective showing one of the briquettes;

Fig. 7 is a view partly in elevation and partly in vertical section, showing on a larger scale than in Fig. 1, the peat drying apparatus;

Fig. 8 is a horizontal section on the line 8—8 of Fig. 7, the parts being shown on a smaller scale than in Fig. 7;

Fig. 9 is an enlarged vertical section on the line 9—9 of Fig. 7;

Fig. 10 is a horizontal section on the line 10—10 of Fig. 7, some parts being broken away; and Fig. 11 is an enlarged fragmentary section on the line 11—11 of Fig. 10.

In Fig. 1, the numeral 12 indicates the framework of a building in which the apparatus is installed and which constitutes no particular part of the present invention. In Figs. 1, 7 and 9, the numeral 13 indicates an elevated platform, preferably of concrete, supported in the main portion of the building 12 by columns 14. A stairway 15, as shown, leads from the main floor to the platform 13, but this is not an essential feature of the invention.

The apparatus which will now be described is designed for taking wet peat, just as it is taken from the ground, and for converting the same into briquettes y, such as shown in Figs. 5 and 6.

In this illustrated arrangement, the wet peat will be shoveled or otherwise delivered onto an endless conveyor 16 and discharged into a hopper 17, which delivers onto vibratory screens 18 of any suitable construction or arrangement, but, as shown, mounted on a framework 19. These screens are of coarse mesh and will carry off large foreign substances, such as roots, and, as shown, will deliver the same to an endless conveyor 20, but the peat will fall through the meshes of the screen 18 onto an endless conveyor 21, by which it will be delivered to a toothed cylinder 22 and cooperating relatively fixed toothed concave 23, both, as shown, mounted in a casing 24. The conveyors 16, 20 and 21, the vibratory screens 18, and the toothed cylinder 22 will be power-driven through any suitable or well known connections. By the action of the cylinder 22 and concave 23, the peat will be disintegrated and broken up into fine particles; in fact, it will be reduced almost to dust form. From the cylinder and concave, the disintegrated peat, as shown, will be received by an oblique endless conveyor 25 and delivered by the cooperating presser rolls 26, which squeeze a considerable amount of the water out of the peat and deliver the same onto a horizontal endless conveyor 27, which delivers the peat to an endless elevator belt 28. The elevator belt 28 delivers to an oblique spout 29 that delivers the peat to the drying apparatus proper, the construction of which will now be further considered.

Depending from the platform 13 is a casing, preferably of cylindrical form and made up of two sections 30 and 31 vertically spaced to afford an annular gap or outlet 32 but rigidly connected by an outset annular breaching 33. The lower end of the casing 31 is preferably contracted and delivers into an underlying hopper 34 that extends upward around the lower portion of the casing 31 and is connected through an annular screen 35 to an annular breaching 36 having a plurality of upwardly extended air outlet tubes 37. Preferably and as shown, an annular series of oblique baffle plates 38 surround the contracted lower end of the casing 31 and deflect the air as it passes from the hopper 34 toward the breaching 36. The hopper 34 is provided with a depending discharge spout 39.

By reference particularly to Fig. 7, it will be noted that the bottom of the annular breaching 33 is oblique, so that the material caught therein will be discharged by gravity out through a discharge spout 40, shown as provided with a damper 41.

Opening into the upper portion of the casing through the upper section 30 is one or more, as shown two, hot or warm air supply pipes 42. The air pipes 42, as shown, both lead from the discharge spout of a fan or blower 43, the intake pipe 44 of which will be connected to a suitable source of hot or warm air, not shown. Also, as shown, the several air outlet tubes 37 are connected to a common discharge stack 45 shown only in Fig. 1. In Fig. 7, the numeral 46 indicates normally closed cleanout ports in the lower portion of the casing 31.

For delivering the pulverized or finely divided wet or damp peat into the casing of the drier just described, I provide a device of novel construction best shown in Figs. 7, 9, 10 and 11. To receive the peat in the condition stated, from the spout 29, I provide a small funnel-shaped receiver or hopper 47 on the upper end of a feed tube 48 that extends down through the platform 13 into the upper portion of the casing and is held against rotation, as shown, by directly securing the receiver 47 to a fixed framework 49, (see Figs. 1 and 9). Mounted to rotate around the non-rotary feed tube 48 is a sleeve 50 shown as provided at its upper end with a pulley 51 and mounted to rotate on a ball bearing or similar anti-friction device 52, best shown in Fig. 9. Located below the lower ends of the feed tube 48 and sleeve 50 is a disk-like separating head 53 shown as connected by short upright posts 54 to a flange 55 on the lower end of the sleeve 50. This separating head or disk 53 is shown as provided with an axially located upstanding conical spreader 56 and, extending radially outward therefrom, it is provided on its upper face with oblique flanges 57, the purpose of which will appear in the description of the operation.

Extended axially through the feed tube 48 is a tubular air pipe or stem 58 shown as journaled at its lower end in a spider bearing 59 to the lower portion of the tube 48 and at its upper end journaled in a fixed bearing 59 on the frame 49, (see Fig. 9). Within the hopper 47, the rotary stem 58 is provided with a spiral vein or feed flange 60, and within the tube 48, said stem is provided with downwardly extended air discharge nozzles 61 and with oblique radially projecting propeller or feed flanges 62. Also, the extreme lower end of the stem 58 is preferably open for the discharge of air directly downward against the point of the spreader cone 56.

For rotating the sleeve 50 and sprayer disk 53, I have shown a small electric motor 63, the rotor of which is provided with a pulley 64, (see Fig. 7), over which and the pulley 51 runs a belt 65. For rotating the tubular air delivery stem 58, it is shown as provided above the hopper 47 with a pulley 66 over which runs a belt 67 driven from a line shaft 68 or any suitable source of power. The stem 58 will be driven at a very slow speed, say approximately one hundred revolutions per minute, while the sleeve 58 and disk 53 will be driven at a relatively very high speed, say approximately thirty-five hundred revolutions per minute.

The lower end of the hopper discharge spout 39 is turned horizontally and is connected by a short lateral tube 69 to a wide fuel delivery nozzle 70 that overlies an endless conveyor in the form of a wide feed belt 71, which, as shown, runs over rollers 72 and 73 mounted on a suitable framework 74, best shown in Fig. 3. The discharge orifice of the nozzle 70 is of vertically shallow horizontally elongated form, such as will deliver onto the belt 71 a flat sheet of dried pulverized peat, marked by the character $y^1$ on Figs. 2 and 3. To insure the delivery of the pulverized or finely divided dry peat from the spout 39 into the nozzle 70, the latter is shown as provided with a transverse feed screw 75, the shaft of which projects at one end and is provided with a pulley 76 over which runs a suitable power-driven belt 77.

When the dried finely divided peat is to be formed into briquettes, a suitable liquid binder, such as crude oil, liquid tar, or the like, should be commingled therewith, and to supply this in the form of a spray, as shown, a perforated spraying pipe 78, that overlies the sheet $y^1$, just beyond the nozzle 70, and is connected to a suitable source of supply by a supply pipe 79, (see particularly Figs. 2, 3 and 4).

The conveyor feed belt 71 delivers to the briquette-forming machine. This briquette-forming machine is preferably of the continuously acting type and comprises a pair of co-operating heavy forming drums 80 and 81 mounted in a suitable framework 82. The lower drum 80 is mounted in immovable bearings, and the upper drum 81 is mounted in movable bearings 83 subject to high compression springs 84 made adjustable by screw-manipulated followers 85, suitably mounted in said framework. The drums 80 and 81 are formed with cooperating briquette-forming pockets 86 adapted to form briquettes $y$, preferably of the form shown in Fig. 6. The shafts of the two drums 80 and 81 are connected to rotate with properly timed actions by cooperating intermeshing gears 87, and the shaft of the lower drum is shown as provided with a gear 88 that will mesh with a power-driven gear, not shown but driven in any suitable way from any suitable source of power.

The sheet of dry pulverized peat $y^1$ will, by the belt 71, be delivered directly between the drums 80 and 81 and the resulting product delivered by the drums will be the briquettes $y$ and small fragments formed by surplus material not pressed into the briquettes proper. Both the briquettes and the fine particles will drop onto an endless conveyor belt 89 and from thence may be delivered to a screen 90, through which the fine particles will pass, while the briquettes will be delivered onto a conveyor belt 91 and, by the latter, conveyed at any suitable point of discharge. The small particles passing through the screen 90 will drop onto a conveyor belt 92 and will be delivered to any suitable point of discharge, but will not be recommingled with the briquettes. These fine particles will be used as fuel, much the same as buckwheat coal is now used, while the briquettes constitute the main and higher grade fuel product.

Certain features of the operation of the apparatus described have already been stated, but some of the more important operations have not as yet been fully disclosed and will presently be described, after first giving further consideration to the difficult problem involved in the proper drying of peat.

The economical commercial drying of peat and the preparation of the same for fuel has not heretofore been solved. Peat, in mass, cannot be properly dried and reduced to fuel form suitable for briquettes or for use as dust fuel either by natural or artificial means. When an attempt is made to dry it in mass, it will cake and become very unevenly dried, so that before it could be used as dust fuel, it would have to be thoroughly disintegrated and further dried, which would make the cost prohibitive for the reason that the produced fuel would not have in value much if any exceeding the cost of drying and preparing it.

I have found that the peat, while moist or wet, may be easily disintegrated and reduced to finely divided form and that, by the proper manipulations, it may be very quickly and economically dried by projecting the dust-like or finely divided peat through a blast or current of warm or hot air under such conditions and actions that the drying of the peat will take place while the peat is floating or is suspended in the air, and the fine particles thereof separated, one from the other, so that they will be precipitated in thoroughly dried form and will not reunite and form a mass or cake. Peat thus treated is suitable for use as dust fuel capable of being blown or otherwise delivered into a furnace, and, moreover, it is suitable for use in the making of briquettes. For the making of briquettes, it is, however, desirable to add a combustible hydro-carbon binder, such, for example, as crude oil or tar solution.

With the above made statements in mind, the importance of the operation of my improved drier, it is thought, will be readily appreciated.

The disintegrated peat delivered into the hopper 47 will be given its initial downward feed partly by gravity and partly by the action of the spiral vein 60 of the rotary stem 58, and by this action and by the further action of the oblique feed flanges 62 and the downwardly blown blasts of air from the nozzles 61, the peat will be progressively fed downward through the feed tube 48. The blasts of air from the nozzles 51 not only assist in the feeding action but keep the fine particles of peat agitated and separated so that they will not stick together under the compressing actions produced by the spiral vein 60 and oblique feed flanges 62.

The peat delivered at the lower end of the feed tube 48 will, by the spreader 56, be evenly spread around said spreader and onto the central portion of the separating disk 53, which latter, as noted, is rotated at a very high speed, and under the action of centrifugal force, will be thrown in an umbrella-like shower outward within the casing 31. The warm or hot blasts of air from the tangential air supply pipe 42 will, as already stated, set up a downwardly moving spiral rotation or cyclonic action of the air within the casing, so that the shower of peat will be taken up thereby and caused to take very much the same spiral downward course, which not only delays the ultimate precipitation of the peat within the hopper 34, but insures a very thorough agitation and complete drying of the peat particles while they are in suspension or subject to the warm or hot air blast.

It is important, moreover, to note that the separating disk 53 is arranged to rotate in a horizontal plane slightly above the bottom of the annular outlet 32 from the casing into the breaching 33. The peat will contain more or less sand or non-combustible substances that are heavier than the peat and, hence, will be thrown farther radially outward by centrifugal force than will the peat, while the peat, being lighter, will be more quickly effected by the downwardly moving blasts of air. Hence, with the separating disk 53 rotating at the proper speed in respect to the strength of the air blast, it is not only possible but thoroughly practicable to cause the sand and heavy particles to be thrown through the annular outlet 32 into the breaching 33, while the peat will be carried below said outlet 32 and, by the spiral air blasts, carried to the bottom of the casing and, when dried delivered into the hopper 34.

The peat precipitated within the casing will, by the contracted lower end thereof, be delivered into the hopper 34 with the air, but as the air instantly decreases its velocity, on reaching the hopper 34, and is caused to take an abrupt outward turn, the peat will be precipitated to the bottom of said hopper, while the substantially clean air will pass into the breaching 36 and thence outward through the air tubes 37. However, the screen 35 will intercept any peat that may be carried by the air toward the breaching 36. Moreover, the baffle plates 38 further assist in separating the clean air from any peat that may be carried therewith. The completed dry peat will be conveyed from the hopper 34 through the spout 39 and delivered to the conveyor belt 71, as already described. The formation of the briquettes from this point on has already been described. In connection with the action of the separating disk or head 53, attention may be further called to the fact that the oblique flanges 57 act on the peat and heavier particles to tend to raise the same as they pass off from the disk, and thus give the sand and peat a better chance to separate under the combined actions of centrifugal force, gravity and the modifying action of the air blast.

From the foregoing description, it must be evident that my invention is capable of very considerable modification and that, while I have herein illustrated a very complete apparatus adapted to treat the peat from the time that it is in wet cake form up to the time it is formed into briquettes, many of the novel features herein disclosed are capable of use in very much less complete apparatus or installations. This is particularly true in respect to the drying apparatus, or, in other words, the mechanism for receiving the wet pulverized peat, and for drying and precipitating the same in dry pulverized or finely divided condition, suitable for use either as dust fuel or for the making of briquettes.

What I claim is:

1. The process of producing peat in finely divided dry condition, which consists first in disintegrating wet or damp peat, second in projecting the disintegrated peat in a shower through a drying air current and drying the same by said air current while floating or suspended therein, and third in precipitating and collecting the pulverized or finely divided dry peat.

2. The process of producing peat in finely divided dry condition and in thereafter forming briquettes thereof, which consists first in disintegrating wet or damp peat, second in projecting the disintergrated peat in a shower through a drying air current and drying the same by said air current while floating or suspended therein, third in precipitating and collecting the pulverized or finely divided dry peat, and fourth in compressing such pulverized peat into the form of briquettes.

3. The process of producing peat in finely divided dry condition, which consists in disintegrating wet or damp peat, in producing a spirally moving current of drying air, in projecting the disintegrated peat in a shower into said spiral air current while floating or suspended therein, and in precipitating and collecting the pulverized or finely divided dry peat.

4. The process of producing peat in finely divided dry condition, which consists in disintegrating wet or damp peat, in subjecting the same to the action of centrifugal force to thereby produce an outwardly and downwardly projecting shower, in producing a downwardly moving whirling current of air through which said shower of peat is projected and thereby drying the peat while it is floating or suspended in the said air current, and in precipitating and collecting the pulverized or finely divided dry peat.

5. The process of producing peat in finely divided dry condition, which consists first in disintegrating wet or damp peat, second in projecting the disintegrated peat in a shower through a drying air current, and in separating from the peat foreign substances such as sand by imparting thereto momentum exceeding that imparted to the peat, and in collecting the pulverized or finely divided dry peat.

6. The process of producing peat in finely divided condition, which consists first in disintegrating the wet or damp peat, second in projecting by the action of centrifugal force the disintegrated peat in a shower, through a drying air current and drying the same by said air current while floating or suspended therein, and in precipitating and collecting the pulverized or finely divided dry peat.

7. The process of producing peat in finely divided dry condition, which consists in disintegrating the wet or damp peat, in producing a downwardly moving whirling air current, in projecting the disintegrated peat in an umbrella-like shower downward through said whirling air current and thereby drying the same while floating or suspended therein, and in precipitating and collecting the pulverized or finely divided dry peat.

8. The process of producing peat in finely divided condition and subsequently forming briquettes thereof, which consists in disintegrating wet or damp peat, in projecting the disintegrated peat in a shower through a drying air current and drying the same by said air current while floating or suspended therein, and in precipitating and collecting the pulverized or finely divided dry peat.

9. The process of producing peat in finely divided condition and subsequently forming briquettes thereof, which consists in disintegrating wet or damp peat, in projecting the disintegrated peat in a shower through a drying air current and drying the same by said air current while floating or suspended therein, in precipitating and collecting the pulverized or finely divided dry peat, in adding a combustible fluid binder to said dry peat, and finally in compressing the same in the form of briquettes.

10. The process of producing peat in finely divided dry condition and subsequently forming briquettes thereof, which consists in disintegrating wet or damp peat, in projecting the disintegrated peat in a shower through a drying air current and drying the same by said air current while floating or suspended therein, in precipitating the pulverized or finely divided dry peat and collecting the same in the form of an evenly spread sheet, in adding a liquid binder to the pulverized peat while in the form of a sheet, and finally in compressing the same to form briquettes thereof.

In testimony whereof I affix my signature.

FREDERICK A. PLUMMER